United States Patent [19]

Kronogard

[11] 4,025,221
[45] May 24, 1977

[54] AUTOMOTIVE GAS TURBINE POWER PLANT

[75] Inventor: Sven-Olof Kronogard, Lomma, Sweden

[73] Assignee: United Turbine AB and Co., Kommanditbolag, Sweden

[22] Filed: Mar. 3, 1976

[21] Appl. No.: 663,475

Related U.S. Application Data

[63] Continuation of Ser. No. 471,173, May 17, 1974, abandoned.

[30] Foreign Application Priority Data

May 22, 1973 Sweden .............................. 7307157

[52] U.S. Cl. ......................... 60/39.16 S; 60/39.75
[51] Int. Cl.² ...................... F02C 3/10; F02C 7/02
[58] Field of Search ................. 60/39.16 R, 39.16 S, 60/39.16 C, 39.75; 415/214

[56] References Cited

UNITED STATES PATENTS

| | | | |
|---|---|---|---|
| 2,297,508 | 1/1942 | Schütte | 415/214 |
| 2,656,677 | 10/1953 | Peterson | 60/39.51 R |
| 2,855,179 | 10/1958 | Brown | 415/214 |
| 3,488,947 | 1/1970 | Miller et al. | 60/39.15 S |
| 3,632,222 | 1/1972 | Cronstedt | 60/39.75 |

Primary Examiner—Carlton R. Croyle
Assistant Examiner—L. J. Casaregola

[57] ABSTRACT

An automotive gas turbine which includes at least one power turbine rotor and at least one further turbine rotor driving at least one compressor, as well as a variable transmission for transferring energy from either of the rotors. The compressor rotor is made of lightweight material and the variable transmission is arranged in such a manner that the power transferring train from the transmission to the compressor rotor will obtain considerably less than moment of inertia than the power transfer train from the pertaining turbine rotor to the transmission. Last-mentioned portions of the power transfer train will thus form a rotatable body, the inertia of which is connectable to the compressor rotor, for instance, during starting or acceleration. If a further turbine rotor is directly connected to the compressor rotor, this further turbine rotor is made of ceramic material, which has a low specific weight, and will not noticeably increase the moment of inertia of the compressor unit; a main point in the arrangement is that the inertia-providing body is rotatable independently of the power output shaft, so it may be kept in readiness even when a vehicle is stopped.

6 Claims, 6 Drawing Figures

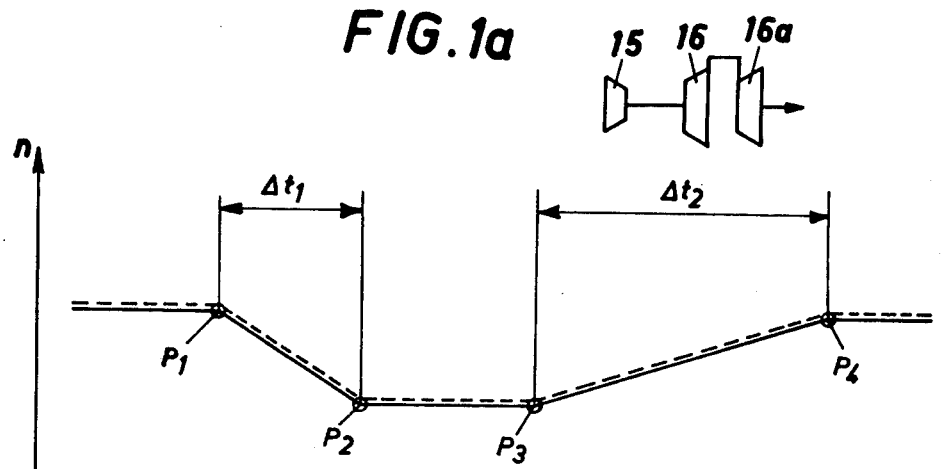
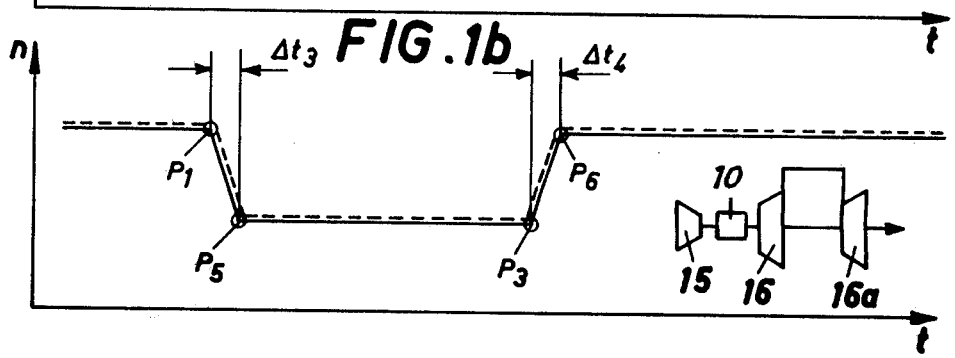
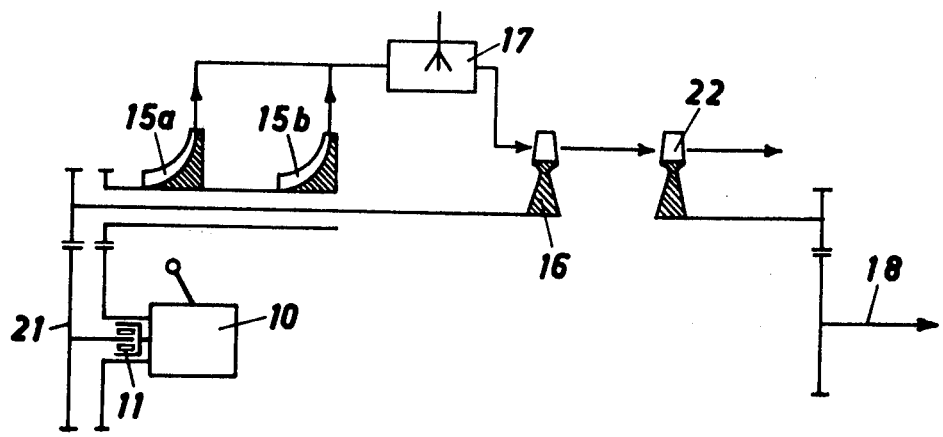

AUTOMOTIVE GAS TURBINE POWER PLANT

BACKGROUND OF THE INVENTION

This is a continuation application of my application Ser. No. 471,173 filed May 17, 1974 now abandoned.

In power plants where the demands for rapid changes in power output and/or number of revolutions, such as is the case with vehicle engines, especially those adapted for passenger cars, buses and pleasure boats, a gas turbine of conventional design has difficulties to be accepted due to its slow acceleration. Hitherto proposed solutions of this problem, by increasing the power output of the turbine, or by the use of raised temperatures and of high quality alloys are unsatisfactory, as they reduce the efficient life time of the turbine, or increase the production price unacceptably.

A passenger car used in urban traffic must repeatedly be stopped or braked, and then started or accelerated. If the car is provided with a gas turbine machinery of any known type it cannot, without being burdened with the disadvantages mentioned above, follow the rhythm of cars having conventional piston engines. Comparable driving properties must, however, be regarded as a minimum requirement for safety reasons, and a necessity for being able to follow the traffic in crowded streets and roads.

SUMMARY OF THE INVENTION

An efficient and economic possibility to provide a momentarily applicable addition of energy, which results in a rapid acceleration, is obtained if the gas turbine power plant, which as basic components includes at least one compressor rotor, at least one turbine rotor driving the same as well as a separate power output turbine, according to the invention is arranged so at least the compressor rotor is made of lightweight material, and this is partly accelerated, the plant further includes at least one rotatable body mounted upon a shaft separate from the compressor, as well as means for transferring rotational energy from the rotatable body to the compressor rotor during acceleration thereof. The rotatable body must not be mechanically locked to the power output turbine rotor. In this manner, the compressor will deliver the increased volume of air necessary for the combustion of the increased quantity of fuel supplied for acceleration purposes considerably more rapidly than in a conventional gas turbine power plant. Hereby an operational characteristic fully equivalent to, or perhaps even better than that of the best piston engine is obtainable. This furthermore is attainable during favorable temperature conditions, as the acceleration is not followed by exceptionally high temperatures. The system implies that the power plant for the same drivability may be designed with a lower power output, and thus will be correspondingly cheaper, while simultaneously the reduced, or eliminated temperature shocks will result in an increased working life time and make possible the use of cheaper materials and promote reduced manufacturing costs.

The rotatable body may include one or more, further compressor and/or turbine rotors, one of these, by way of a reduction gear, being connected to an output shaft. The rotatable body/turbine rotor and the compressor rotor may be connected to this reduction gear in such a manner that forces of reaction issuing when transferring to the output shaft.

Brief description of the drawings

FIGS. 1a and 1b respectively show very schematically, the basic layout and the acceleration and retardation performance of the gas-producing unit of a plant of conventional design, and one according to the invention;

FIG. 2 shows a plant including two turbine and two compressor rotors mounted upon two shafts;

Description of preferred embodiments

Figure 3:
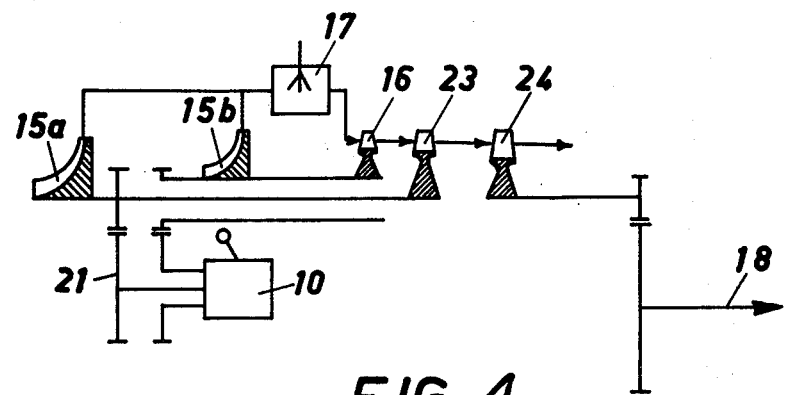
FIG. 3 shows a plant including three turbine and two compressor rotors mounted upon three shafts.

FIG. 1 is a graph illustrating the retardation and acceleration characteristics on the one hand for a conventional gas turbine plant having a common shaft for the compressor 15 and the turbine 16, and a further turbine rotor 16a operating on an independent shaft, as well as for a simplified embodiment according to the invention used for illustration purposes, where the turbine rotor 16 is connected to the compressor rotor 15 by way of a variable transmission 10.

It is supposed that compressor rotor 15 is made of lightweight material, whereas the first turbine rotor is made of metallic material, and thus possesses a high inertia than the compressor rotor. As there is no locked mechanical connection between the two rotors, rotor 16 may be kept rotating even if rotor 16a is stalled, for instance, when the car is stopped or retarded.

Rotor 16, and the pertaining part of the transmission thus forms a body which maintains a certain amount of rotational energy, which may be used for speeding up the compressor, when the car is restarted. By adjusting the fuel supply the rotatable body may temporarily be kept running at a speed above what is actually needed to maintain the installation idling.

The graphs show changes in numbers of revolution during a certain period of time, for instance when a car is braked and then accelerated, The speed of the compressor is denoted by a full line and the turbine speed a dashed line.

From the moment of braking P1 until the speed of the compressor and turbine rotors at P2 have been reduced to idling speed a period of time, denoted $\Delta t_1$, is required. For starting the plant at P3 until the rotor has reached full speed at P4 a period of time $\Delta t_2$ is required. The retardation and the acceleration are here comparatively slow.

FIG. 1b shows the corresponding conditons at a simple plant according to the invention. From point P1 the speed will rapidly be reduced to idling speed at P5 during a period of time $\Delta t_3$, while an increase to full speed from P3 to full speed at P6 will require a period of time $\Delta t_4$. It is evident that the moments of time $\Delta t_3$ and $\Delta t_4$ are considerably shorter than $\Delta t_1$ and $\Delta t_2$.

The drawings show more in detail principal arrangements of a workable turbine transmission systems according to the invention. The systems of course include means for governing the acceleration and retardation processes.

The plant according to FIG. 2 includes two compressor rotors 15a, 15b mounted on the same shaft and driven by a turbine 16 through a gearing 21 by way of a variable transmission 10 and free wheel 11. The output shaft 18 is connected to a further turbine rotor 22. Compressor rotors 15 a and 15b are made of lightweight material whereas turbine rotor 16 is made of metallic material. The variable transmission 10 is located in the power train between turbine rotor 16 and the compressor so as to allot a heavier portion of the transfer train to the turbine side thereof. It should be noted that turbine rotor 22 is completely independent of the gas generator part.

Turbine rotor 16 and the pertaining portion of the power transfer train forms the rotatable body. During an acceleration period an increased amount of fuel is supplied which of course makes possible an increase of power at turbine rotor 16, but the stored inertia means a momentarily available energy above what is possible to attain solely by the increased combustion.

The embodiment according to FIG. 3 includes three turbine rotors 16, 23 and 24, of which the latter by way of a reduction gear drives the output shaft 18.

Turbine 16 drives the compressor rotor 15b directly. The second turbine rotor 23 drives the first compressor stage 15a and is by a gear box 21 and variable transmission 10 connected to the second comressor stage 15b. The first compressor stage 15a and turbine 23, plus part of gear box 21 here from the additonal rotatable body.

The turbine rotor 16, which drives the compressor, operates on the gas having the highest temperature and it is therefore preferably made of ceramic or similar material. This has a density of about 2.7 which results in low inertia and makes possible a rapid acceleration. The material used in the compressor is usually light metal having about the same specific gravity, i.e., 2.7. The second turbine rotor 23 is made of heat resistant material which has a density of about 7.8. This provides, compared to the first rotor, a higher moment of inertia, which is advantageous with respect to the function as rotating body and in consideration of the load on and the dimentioning of the variable transmission for a desired acceleration capacity.

Figure 4:
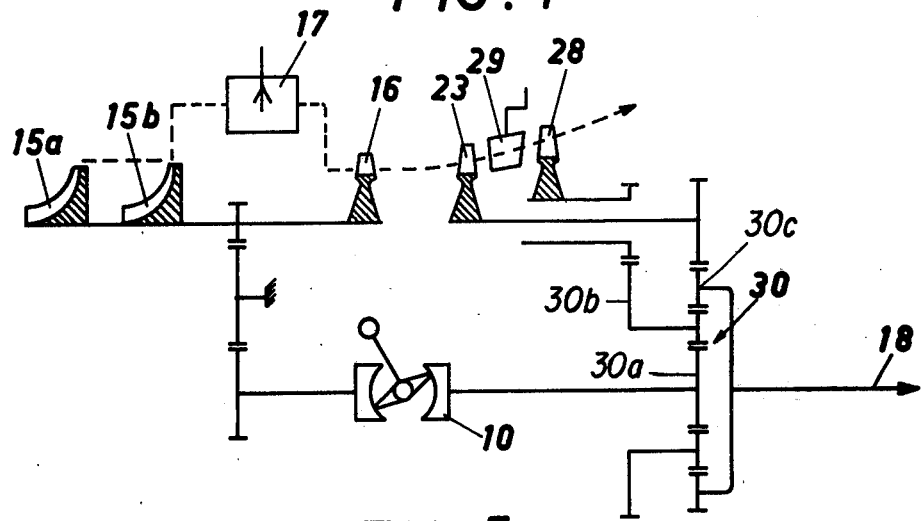
FIG. 4 shows a development of the plant of FIG. 3, where two turbine rotors by way of a planetary gear are connected to an output shaft, and are connected to the gas-producing unit by a variable transmission.

With the embodiment according to FIG. 4 two compressor states 15a and 15b are driven by a first turbine 16. Two further turbine rotors 23 and 28 are by way of a planetary gear 30 connected to the output shaft 18. Intermediate last-mentioned turbine stages there are adjustable inlet guide vanes 29, whereby the geometry of the inlet to the last turbine stage may be altered to suit the requirements at different operational conditions. The compressor rotor and the turbine rotor 16 are made of lightweight material, whereas rotors 23 and 28 are made of metallic material.

The sun wheel 30a of the planetary gear is by way of a variable transmission 10 connected to the gas generator part. Turbine rotor 28 is drivingly connected to the planetary gear wheel carrier 30b. A rim wheel 30c has internal teeth engaging the planetary gear wheels and external teeth receiving the output from turbine rotor 23. The arrangement permits rotation of the planetary gear wheel carrier and the sun wheel, even if output shaft 18, rim wheel 30c and turbine rotor 23 are stalled. The last turbine stage 28 and the pertaining part of the planetary gear will thus form the rotatable body. The arrangement of the planetary gear is such that the forces of reaction issuing when the sun wheel, after a start-up, is driven by the rotatable body will increase the power transfer to the output shaft.

Figure 5:
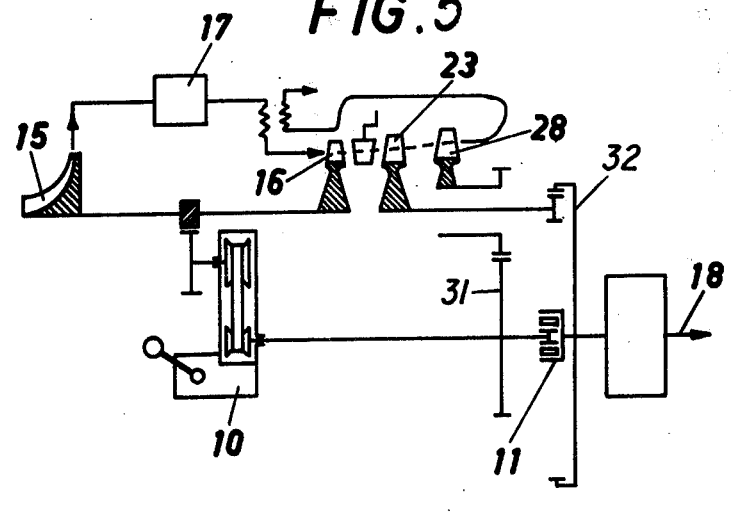
FIG. 5 shows a further development with simplified counter-rotating turbine system, where the stator between the two last turbine stages has been deleted and the variable transmission is designed as a simple and cheap belt variator.

With the embodiment according to FIG. 5 the last turbine stage 28 forms part of the rotatable body utilized for acceleration of the gas producing part. As the turbine system here is designed for counter rotation and the power turbine stage delivers gas directly into the final stage without any intermediate stator, a very favorable acceleration and driving moment characteristics will be obtained at low speed of the power turbine. A free wheel 11 is fitted between a first gear wheel 31 in the train from rotor 28 and a second gear wheel 31 in the train from rotor 23 to permit power transfer to the gas generating part, even if the output shaft is blocked.

The variable transmission is here, as an alternative, designed as a belt-type variator, which makes possible a simple and cheap production and is especially suitable, when ceramic material is used in the first turbine stages, which means a reduced moment of inertia for the gas-producing part. The example above described are some preferred embodiments. only, which are possible within the spirit of the invention, but it is evident that further combinations and modifications may be made within the scope of the appended claims.

What I claim is:

1. An automotive gas turbine power plant comprising: (a) a combustor, (b) at least one first turbine rotor, (c) at least one compressor rotor comprising a lightweight material relative to said first turbine rotor, (d) power transferring means including shafting and gears connecting said one first turbine rotor and said one compressor rotor, (e) variable transmission in said power transferring means dividing said power transferring means into a first portion running from the said variable transmission to the said one compressor rotor and a second portion running from the said at least one first turbine rotor to the said variable transmission, said first portion having a considerable less moment of inertia and the second portion, (f) at least one second turbine rotor connected to a power output shaft, and (g) control means permitting said one first turbine rotor and said second portion of the power transferring means associated therewith to rotate independently of said at least one second turbine rotor.

2. An automotive gas turbine power plant comprising: (a) a combustor, (b) first turbine rotor comprising a lightweight material relative to a second turbine rotor, (c) at least one compressor rotor comprising a lightweight material relative to a second turbine rotor, (d) a common shaft interconnecting said first turbine rotor and said compressor rotor, (e) a second turbine rotor, (f) power transferring means including shafting and gears connecting said second turbine rotor and said one common shaft, (g) a variable transmission is in said power transferring means dividing said power transferring means into a first portion running from the said variable transmission to said common shaft and a second portion running from the said second turbine rotor to the said variable transmission, said first portion having a considerable less moment of inertia than the second portion, (h) at last one third turbine rotor connected to a power output shaft, and (i) control means permitting said at least one second turbine rotor and said second portion of the power transferring means associated therewith to rotate independently of said at least third turbine rotor.

3. The automotive gas turbine power plant according to claim 2 further including a second compressor rotor and means to drive the same from said second portion of the power transfer means.

4. The automotive gas turbine power plant according to claim 2 in which the power transferring means includes a planetary gearing having a sun wheel, planetary gear wheels, a planetary gear wheel carrier and a rim wheel with internal and external teeth, means for connecting the input from said second and said third turbine rotors to said planetary gear wheel carrier and said rim wheel, and to connect the output to said power take off and said variable transmission to said rim wheel and said sun wheel.

5. The automative gas turbine power plant according to claim 2 in which the power transferring means includes a planetary gearing having an input carrier for planetary gear wheels, rim gear having internal teeth cooperating with said planetary gear wheels as well as external input teeth, means for connecting said second and said third turbine rotors to said input and means for transferring output from said planetary gear wheel carrier and said sun wheel to output shaft and said variable transmission.

6. The automotive gas turbine power plant according to claim 2 in whch the power transferring means includes a firstgear wheel operatively connected with said second turbine rotor, a second gear wheel operatively connected to said third turbine rotor, a common rotational axis for said first and said second gear wheels, and a free wheel interconnecting said first and said second gear wheels, said free wheel being adapted to permit the first gear wheel to run faster than said second gear wheel.

* * * * *